United States Patent

[11] 3,594,921

| [72] | Inventor | Hubert H. Quicker, Jr.<br>2523 Hewitt St., La Crosse, Wis. 54601 |
|---|---|---|
| [21] | Appl. No. | 834,802 |
| [22] | Filed | June 19, 1969 |
| [45] | Patented | July 27, 1971 |

[54] DRIVER TRAINING AND TESTING APPARATUS
32 Claims, 4 Drawing Figs.

| [52] | U.S. Cl. | 35/11 |
|---|---|---|
| [51] | Int. Cl. | G09b 9/04 |
| [50] | Field of Search | 35/11, 12 L, 12 W |

[56] References Cited
UNITED STATES PATENTS

| 2,742,714 | 4/1956 | Allgaier | 35/11 |
|---|---|---|---|
| 3,127,685 | 4/1964 | Ellison | 35/12 W |
| 3,154,864 | 11/1964 | Jazbutis | 35/11 |
| 3,251,142 | 5/1966 | Jazbutis | 35/11 |

Primary Examiner—Wm. H. Grieb
Attorney—Parker, Carter and Markey

ABSTRACT: A driver-training apparatus including means for simulating various driving conditions, such as fixed objects in the path of the driver, passing situations, varying weather conditions, varying types of automobiles, and other conditions customarily encountered in day-by-day driving. There is a console for the student driver which includes the conventional brake, accelerator and steering wheel, as well as various meters for use by the student to determine his effectiveness in driving. There is a control unit operated by the instructor whereby he may program certain driving conditions to which the student must react while sitting at the training console.

PATENTED JUL 27 1971
3,594,921
SHEET 1 OF 2
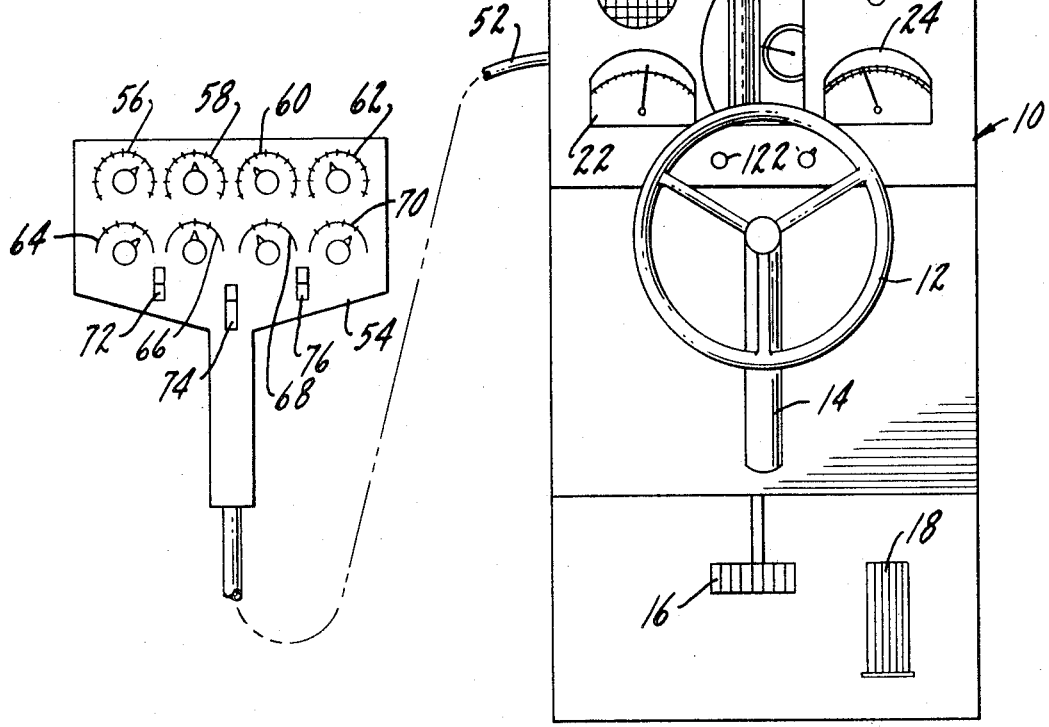
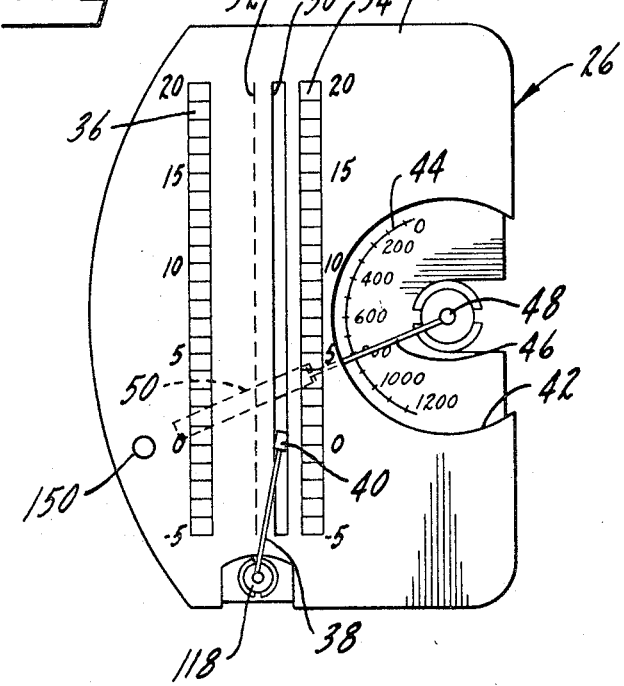
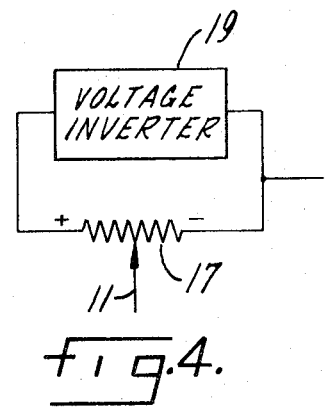
INVENTOR.
Hubert H. Quicker, Jr.
BY Parker, Carter & Markey
Attorneys.

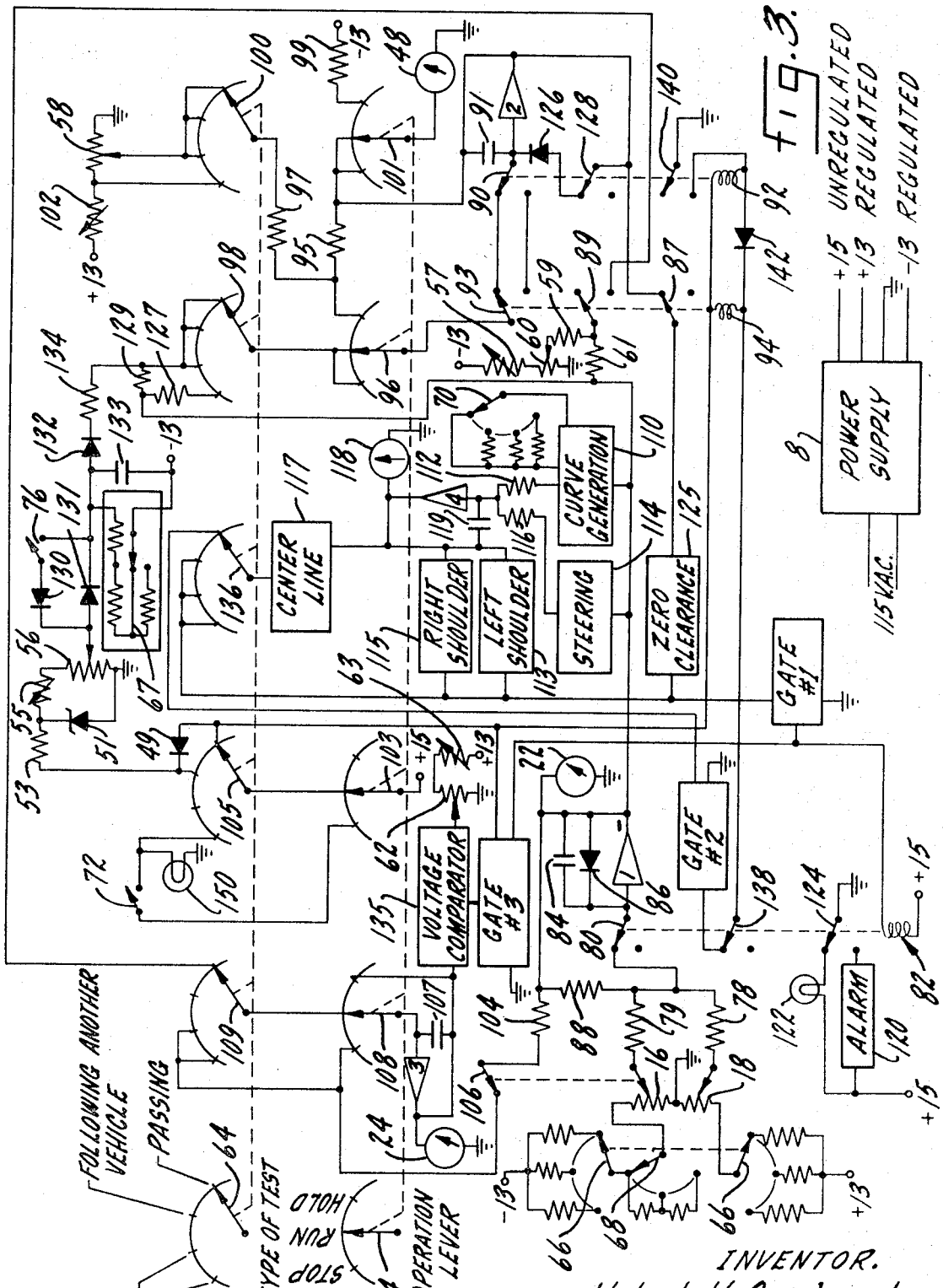

DRIVER TRAINING AND TESTING APPARATUS

SUMMARY OF THE INVENTION

This invention relates to an educational apparatus and more particularly to a testing device having application in the driver-training field.

One object of the invention is an apparatus of the type described which simulates various road driving conditions.

Another purpose is an apparatus of the type described for use in testing the reaction of the student driver to various road conditions.

Another purpose is a driver-training apparatus including means for measuring reaction distance.

Another purpose is a driver-training apparatus of the type described which simultaneously presents various road conditions to the student whereby his reactions can more closely approximate actual driving situations.

Another purpose is a driver-training apparatus which is effective to acquaint a student driver with many of the various road and driving conditions that he may encounter during day-by-day driving, prior to actual time behind the wheel of an automobile.

Another purpose is a driver-training apparatus of the type described which is useful in teaching a student how to react to various stimuli, for example either fixed or moving objects in the road, or common automobile passing situations.

Other purposes will appear in the ensuing specification, drawings and claims.

BRIEF DESCRIPTION OF THE DRAWINGS

The invention is illustrated diagrammatically in the following drawings wherein:

FIG. 1 is a plan view of an automobile testing and training apparatus,

FIG. 2 is an enlarged view of one of the meters provided for the student's use,

FIG. 3 is a schematic diagram of the electrical circuit used herein, and

FIG. 4 is a schematic diagram of the steering unit.

DESCRIPTION OF THE PREFERRED EMBODIMENT

In FIG. 1, the driver-training apparatus may include a console, indicated generally at 10, which has many of the customary controls of an automobile. Although a seat or chair is not shown, conventionally the student will sit directly behind the steering wheel as he would in an automobile. The control console 10 includes a steering wheel 12 mounted on a steering column 14. There is a brake pedal 16 and an accelerator 18. Positioned above the steering wheel 12 is a loudspeaker 20 which may be used to provide an audio alarm to indicate incorrect operation of the student's auto. A light 21 provides a visual alarm. Directly below the loudspeaker 20 is a meter 22 which is a conventional speedometer and will indicate to the student the simulated speed at which he is driving. Across from the speedometer 22 is a meter 24 having two scales. This meter, which will be described in detail hereinafter, may be calibrated either in terms of feet or car lengths, and measures reaction distance, distance in the passing lance, or the closing distance between two vehicles in the passing lance, depending upon the test being run. The control console 10 is completed by an indicating device 26, shown in detail in FIG. 2.

The indicating device 26 may include a faceplate 28 having a longitudinally extending slot 30. The slot 30 is on one side of a simulated road having a centerline 32. There are shoulders 34 and 36 on opposite sides of the centerline 32, forming scales which may be conveniently calibrated either in car lengths or in feet, but preferably in car lengths. Note that the slot 30 is on the right-hand side of the road and that there is a generally blank area on the left-hand side of the road, or in the left-hand lane. At the bottom of the indicator 28 is an arm 38 mounting a scale auto 40 at its outer end. The arm 38 is controlled, as described hereinafter, so as to simulate the position of the student's car on the road. The scale car 40 cannot move up and down the road, but it can move from the right-hand lane to the left-hand lane, or off the road if the student should so direct it.

There is a second cutout area 42 on the indicator 28 generally circular in form which exposes a scale 44 calibrated in feet. An arm 46 is part of a meter 48 and will be controlled as described hereinafter. The left-hand end of arm 46 has an enlarged section 50 which is preferably opaque and is positioned to move behind the slot 30. There may be a light behind the slot to provide greater contrast between the slot and section 50. That portion of the enlarged area 50, which is visible through the slot 30, is used to simulate a second car, the same size as the scale car 40. In effect, the position of arm 46 determines the position of a second scale car relative to the student's scale car 40.

Attached to the student's console 10 by a cable 52 is a control member 54 having a number of dials and switches. Starting at the upper left-hand corner, the first dial controls the speed of the second auto, whose position is represented by section 50 and is indicated at 56. Dial 56 is a potentiometer, as are many of the control elements. The second dial, indicated at 58, controls the entrance position of a fixed or moving object in the path of the student's car and also is a potentiometer. The third dial, indicated at 60, controls the speed of a third car, which may be used to simulate a car approaching in the left-hand lane and is again a potentiometer. The fourth dial, indicated at 62, is used to control passing distance. It is also a potentiometer. Starting on the second row of dials, at the far left-hand side, is a gang switch 64 controlling a number of different functions and designated a "type of test" switch. The next switch, indicated at 66, controls the type of auto and is used so that the student may observe the different braking and acceleration conditions found in different makes of automobiles. As indicated in detail in FIG. 3, switch 66 has two portions, one of which is used to effect the braking functions of the student's automobile and the other is used to effect acceleration. The third dial in the second row is used to simulate road conditions affecting braking and is indicated at 68. This dial controls the braking characteristics of the trainee's auto and the preceding auto, as road conditions are common to the two autos. The last dial on the second row, indicated at 70, is used to program different types of curves which could affect the student's driving and again is a multiposition switch. There are three additional switches on the control console 54: a brake light on-off switch, indicated at 72, controls the brake lights of auto 02; a hold-run-stop switch, indicated at 74; and a type-of-stop switch having a normal position and a forced position. This switch, indicated at 76, controls the stopping characteristics of the second auto.

There are basically four tests which can be given to the student and each of these tests will be taken individually and the various circuit components will be described in connection with each test. It should be pointed out that the purpose of the device shown herein is not to teach a student how to drive an automobile, but only to expose him to the various conditions which can come about during normal driving. A student cannot learn to drive merely by concentrating on how fast he can apply the brake pedal. Rather, he has to be aware of all of the factors which can affect driving when he is required to apply the brake. Accordingly, many road conditions are simulated and the student's reactions to braking or passing, etc., are measured while the other conditions are present.

In FIG. 3, a power supply is indicated at 8, and is used to provide the various voltages described herein.

The accelerator 18 is shown as a potentiometer in FIG. 3 and is indicated by the same numeral. In like manner, the brake 16 is indicated by the numeral 16 in FIG. 3 and is again a potentiometer. When the student first begins to use the driver-training apparatus, he will initially be instructed to bring the car up to a predetermined speed. He depresses the accelerator 18 which will provide a voltage from potentiometer 18, through resistor 78, and to an arm 80 of a relay indicated generally at 82. The amount of voltage which the student can apply from the potentiometer by depressing the accelerator is determined by the position of switch 66, which is the "type of auto" switch. Note that a +13 volts is applied to three different resistors which are a part of the switch 66. Depending upon the position of the switch, varying amounts of voltage can be applied to the bottom of potentiometer 18. Thus, for a car with a small motor, less voltage may be applied to the potentiometer 18 to simulate less acceleration. For a faster car, for example a Chevrolet Corvette, a lesser amount of resistance may be used, providing more voltage at potentiometer 18. Again, the only purpose of the switch 66 is to more closely approximate driving conditions with different types of automobiles.

The voltage applied to the arm 80 of the relay 82 is an indication of acceleration. Acceleration is a function of distance divided by time squared. By integrating a voltage representing acceleration, the result is velocity. Connected to the arm 80 is a very high gain DC amplifier, commonly termed an operational amplifier which, with a capacitor 84, forms an integrating circuit. This integrating circuit is designated as integrator 01. The output from integrator 01 will be a negative voltage if the input is positive and the voltage will be the integral of the input which was acceleration, and hence the output will be a measure of velocity. A diode 86 may be in parallel with the capacitor 84 for the purpose to be described hereinafter. The output from integrator 01 goes to the speedometer 22 to display the velocity of the automobile.

A resistor 88 may be connected on one side to the output of integrator 01 and on the other side to the junction of resistors 78 and 79 to provide a feedback function. Meter 22 customarily reads a voltage which is negative at the top side of the meter, and positive or ground at the bottom side. In effect, resistor 88 dampens any increase in acceleration and the greater the output of integrator 01, or the greater the negative voltage applied to meter 22, the more the dampening effect. In essence, at higher speeds it is difficult to obtain increased acceleration and this condition is simulated by the feedback resistor 88.

After the student has brought the car up to a predetermined speed, he may be required to apply the brakes. By depressing the brake pedal 16, he causes the potentiometer indicated at 16 in FIG. 3 to move to an upward position and thus apply a negative voltage to counteract the positive voltage from the accelerator, thereby decreasing the speed. Switch 66, indicating the type of auto, also effects the brakes. Three resistors, indicated in FIG. 3, each of different value to simulate different types of automobiles and their brakes, will vary the amount of negative voltage applied to switch 68. Thus for a heavy car with normal brakes, a resistor will limit the voltage that will be conducted to switch 68. A lighter auto with disc brakes would have a smaller value of resistance, allowing more voltage to pass, thereby providing faster stopping. Switch 68 is designed to simulate various road conditions, for example, wet pavement, icy pavement or dry pavement. Thus, the −13 volts applied to switch 66 will be reduced by an amount depending upon which resistor is in the circuit and then the amount of voltage applied from switch 68 to potentiometer 16 will be further reduced, depending upon the road condition which is being simulated. In the position shown, which might simulate dry pavement, there is no decrease in the braking voltage applied through switch 68, as there is no resistance in the circuit. In a second position there will be an additional resistor added to the circuit simulating wet roads, and in the third position, or the lower position simulating icy roads, there will be still a further resistor added into the circuit. For icy pavement with a very heavy type of car, the actual voltage which can be applied by potentiometer 16 might be only −4 volts instead of −12 volts, the maximum amount. Thus, the braking force which the student can use will depend upon road conditions and upon the type of auto. As soon as the accelerating voltage is removed, and the negative voltage from the potentiometer 16 or the brake is applied, the velocity of the car will begin to decrease, and this decrease will be visible on meter 22.

Because to have meter 22 read a reverse speed will provide no useful function, diode 86, connected across integrator 01, will (by applying 100 percent feedback when the integrator tries to go positive) prevent a positive voltage from being applied to meter 22. In effect, it will not permit the meter to go past zero in a negative direction. Thus, a continued braking force after the auto has stopped will not show a negative speed, but will merely show that the car has been brought to a full stop.

In addition to the braking and accelerating functions which have been described, the student is required to maintain the automobile on the proper side of the road and generally in the center of his lane. He must do this even though various curves are encountered. A curve generator is indicated at 110, and though not described in detail, may include a multivibrator circuit in which the voltage output is dependent upon the amplitude of the voltage input. Note that the voltage input to the curve generator 110 is directly connected to the output of integrator 01. Thus, the voltage input relates to the speed of the automobile. For example, at a very low speed, 15 m.p.h., a sharp curve is not dangerous, whereas it may be highly dangerous at 100 m.p.h.

The instructor, through the use of switch 70, may simulate various types of curves. The switch 70 may place different values of resistance, or no resistance, into the curve generator unit to effect the voltage output from it and thereby vary the degree of the curves. As indicated above, the voltage output from the curve generator unit is dependent upon the speed of the automobile. Thus, the output to resistor 112 is dependent upon the speed of the automobile and the setting of switch 70. Movement of the steering wheel 12, in FIG. 1, also provides a voltage output from the steering control indicated at 114. FIG. 4 is a schematic diagram of steering unit 114. This unit consists of steering potentiometer 17, the right end of which is connected to the output of integrator 01. The same output is inverted by using phase inverting circuit 19, then connected to the left terminal of steering potentiometer 17. The center arm 11 of potentiometer 17 provides the output of the steering unit 114 which is connected to resistor 116. Since for any given speed of the trainee's auto, a negative voltage is applied to one terminal of potentiometer 17 and an equal but positive voltage is applied to the other terminal, arm 11 will be negative when positioned right of center, zero at center, and positive when positioned left of center. Thus, the output of steering unit 114 is determined by the speed of the student's auto and the position of steering wheel 12 which is mechanically connected to arm 11.

The outputs of curve generation 110 and steering 114 are voltages representing lateral velocity, or movement, of the student's auto 40. These voltages are fed through resistors 112 and 116 into integrator 04, a high-gain DC amplifier and a capacitor 119. The output of integrator 04 provides a lateral position voltage to meter 118 which controls arm 38 and thus the road position of the student's simulated auto 40. Meter 118 is a zero center meter; thus a positive output of integrator 04 would place student's auto 40 right of center, while a negative output moves auto 40 to the left of center. Assuming that auto 40 is in a correct driving position, any voltage from the curve generation unit 110, depending upon its polarity, tends to move the student's auto 40 either right or left. The student will attempt to correct these lateral movements of auto 40 by turning steering wheel 12 to produce an equal but opposite voltage output of steering unit 114. Thus, the steering voltage counteracts the voltage generated by the curve generator which again is a function of both the speed of the automobile and the sharpness of the curve which the instructor determines at that time. All the time that the student is accelerating and braking, he must also control the steering functions of the car.

In the event the voltage output from integrator 04 exceeds a predetermined maximum or minimum, signifying either a position of the car on the right shoulder of the road 34 or across the centerline 32, the voltage comparison circuits 115 and 117 designated "right shoulder" and "centerline," assuming switch 64 is not in the passing position, will provide a voltage output to gate 01 with the effect that this gate will then ground the top side of the coil of relay 82. Relay 82 will then move arms 80, 138 and 124 to the down position. Under normal running conditions, a green light, indicated at 122, will be activated through the bottom arm 124 of relay 82. When arm 124 is moved to the down position, light 122 is disconnected while the alarm 120 is activated. At the same time as the alarm is operated, by energizing the coil of relay 82, arm 80 of relay 82 will open the circuit to integrator 01. Since opening this circuit prevents any changes in the input, the voltage output from this integrator, or the voltage to meter 22, will remain constant so the student will know the speed at which he ran off the road or crossed the centerline. At such time as the student should steer back on the road, the voltage comparison circuits would then release gate 01, which would in turn remove the ground from the top of the coil of relay 82 to permit this relay to return to its original position and the test to continue.

The first test which may be given to a student is the braking test. This test demonstrates the actual reaction and stopping distances that will be encountered under various driving conditions. Switch 64 is moved to the braking position. Switch 74 is initially moved to the hold position. Type of auto 66, road surface 68, and curve 70 conditions are set to create the desired driving conditions. The student brings his auto up to the desired speed by the correct usage of accelerator 18 and brake 16, while maintaining a safe road position through proper control of steering wheel 12.

Integrator 02, again including a high-gain DC amplifier and capacitor 91, has its input connected through arm 90 of relay 92, arm 93 of relay 94, section 96 of hold-run switch 74, to the junction of resistors 95 and 97. The resistances of the feedback resistor 95 and the input resistor 97 may be equal, creating a condition where the output voltage from integrator 02 is equal but of opposite polarity to the input voltage at switch section 100 which is connected to the junction of resistors 102 and 58, since switch 64 is in the braking position. Variable resistor 102 is calibrated to provide, at the junction of resistors 102 and 58, the exact positive voltage required to position meter 48 to the full-scale position when it is connected to the output of integrator 02. Full scale on meter 48 represents zero feet on the distance scale 44. Since the input terminal of an operational amplifier is at a virtual ground, the lower end of capacitor 91 is at zero potential, while the top of capacitor 91 had been charged to the negative output voltage of integrator 02. Meter 48 is biased to an off-scale reading by current through resistor 99, and section 101 of switch 74 while in the hold position.

The instructor then moves switch 74 from the hold to the run position. Section 103 of switch 74 conducts the +15 volts through section 105 of switch 64 to brake light 150 which signals the student that a stop is required. Section 96 of switch 74 switches the input of integrator 02 from the junction of resistors 95 and 97 to section 98 of switch 64 through resistor 127 to the output of integrator 01. Section 101 of switch 74 moves meter 48 from the bias resistor 99 to the output of integrator 02. Although the switching of section 96 removes the preset voltage, the capacitor 91 is charged and meter 48 immediately moves from off scale to full scale, as explained above, with arm 46 reading zero on scale 44.

The output of integrator 01 indicative of speed or velocity is applied through resistor 127 to the input of integrator 02 and as the integral of velocity is distance, the output of integrator 02 will be distance and this can be indicated on meter 48 as a given number of feet or car lengths. As integrator 02 was preset to a negative value by a positive input into resistor 97, the now negative voltage input through resistor 127 will cause the output of integrator 02 to move in a positive direction; i.e., to become less negative with arm 46 of meter 48 moving downward. The correct time constant, resistor 127 and capacitor 91, is chosen to correspond with scale 44, providing an accurate measurement of the distance the student's auto travels after switch 74 is moved to the run position. When the student brakes to a complete stop, the resulting zero voltage of integrator 01 cannot influence integrator 02 and meter 48 will have stopped at a given footage on the scale 44. This indicates the total number of feet it took the student to bring the car to a complete stop.

The output of integrator 03, also a high-gain DC amplifier with capacitor 107, is held to zero voltage as it is shorted by section 108 of switch 74 when in the hold position. As the instructor moves switch 74 from hold to run, the velocity voltage from the output of integrator 01 is conducted through resistor 104, normally closed brake switch 106, section 109 of switch 64 which is in the braking position, section 108 of switch 74 to the input of integrator 03. Resistor 104 chosen to provide the correct time constant with capacitor 107, such that the resulting output voltage of integrator 03 causes meter 24 to display the distance that the student's auto has traveled since switch 74 was moved to the run position. When the student hits the brake 16, switch 106 opens, interrupting the voltage into integrator 03. With no input to integrator 03, meter 24 stops moving and one of its scales will display the distance the student's auto moved from the time switch 74 was moved to run, causing light 150 to operate, until the student energized brake 16. This distance is commonly known as the reaction distance.

During the entire test the student must maintain a proper road position or the alarm will be actuated as described above.

When the run-hold switch 74 is returned to the hold position, meters 24 and 48 will return to their original position. Meter 22, the speedometer, is solely controlled by the output of integrator 01 and will continue to operate. Likewise, meter 118 is solely controlled by the output of integrator 04 and will continue to display the road position of the student's auto.

The second test which may be given to a student is the "object in road" test. Switch 64 will be moved to the "object in road" position. The run-hold switch 74 will initially be placed in the hold position. The instructor then determines at what position an object should appear in the road. This position is determined by the setting of potentiometer 58, which will in turn apply voltage through section 100 of switch 64 to input resistor 97. As described above, any positive voltage into resistor 97 produces an equal negative voltage at the output of integrator 02, charging capacitor 91. When the dial of potentiometer 58 is set to, for example, 10 car lengths, the corresponding voltage into resistor 97 will cause capacitor 91 and the output of integrator 02 to be held at a negative voltage equal to 10 car lengths' distance from the student's auto 40 which is positioned at the zero voltage point of meter 48. As explained above, meter 48 is biased off scale. Thus extension 50 representing the stationary object is not visible through slot 30. Auto and road conditions may be set as described above. The student is instructed to maintain a desired speed and a proper road position through correct usage of his controls.

The instructor then moves switch 74 from the hold to the run position. Section 101 of switch 74 moves meter 48 from off scale bias resistor 99 to the output of integrator 02, which was preset to a negative voltage representing 10 car lengths. Section 96 of switch 74 moves the input of integrator 02 from the junction of resistors 95 and 97 to section 98 of switch 64 through resistor 129 to the output of integrator 01. The velocity or speed voltage from integrator 01 is applied through resistor 129 to the input of integrator 02 and upon integration appears as a distance at the output of integrator 02. The output of integrator 01 being negative causes the output of integrator 02 to move in a positive direction (i.e., to become less negative), whereby section 50 of meter 48 will move in a downward direction. Resistor 129, used with capacitor 91, is chosen to provide the proper time constant to correspond with the scale at 34.

The student upon seeing the object 50 suddenly appear at 10 car lengths, immediately tries to stop his auto. While the student is stopping, object 50 approaches his auto 40 at a rate proportional to the instantaneous speed of the student's auto. If the student can stop his auto in less than the preset number of car lengths, the output of integrator 01 will become zero and will have no further effect on integrator 02 and meter 48. Thus, object 50 comes to rest with scale 34 displaying the clearance between said object and student's auto 40. If the student is not able to stop in the required distance, the output of integrator 02 decreases until it becomes zero, wherein object 50 appears to collide with student's auto 40. The output of integrator 02 is also connected through arm 87 of relay 94, to a zero clearance voltage comparator 125. Zero clearance unit 125 upon receiving a zero voltage from integrator 02 operates gate 01 and relay 82, actuating the alarm and clamping integrator 01 to indicate the speed of the student's auto at the instant of collision. One terminal of a diode 126 is connected to the input of integrator 02; the other terminal is connected, through contacts 128 of relay 92, to the output of integrator 02. In the event of a collision between the object 50 and student's auto 40, diode 126 by providing 100 percent feedback when the output tries to go positive, prevents integrator 02 from being driven positive by the undiminished voltage from the clamped integrator 01.

The integrator 03 and meter 24 circuits work as they did in the braking test. Meter 24 measures the reaction distance which is the distance traveled by the student's auto from the moment switch 74 was moved to the run position until the brake was energized.

By moving switch 74 back to hold, the instructor resets integrators 02 and 03 and their corresponding meters. A new test using the same or different conditions can then be run.

The third test which may be given to the student is the "following another vehicle" test. Switch 64 will be moved to the "-following another vehicle" position. The hold-run switch 74 will initially be placed in the hold position. The desired auto and road conditions as mentioned above may be set. The instructor sets dial 56 to provide the desired speed of the preceding auto which is represented by section 50 of meter 48. Dial 58 is set to provide the entrance position of the preceding auto. This presets integrator 02 as explained in the preceding test. The student is instructed to bring his auto up to approximately the same speed as the setting of dial 56. He must also maintain a proper road position or the alarm will be actuated as described above.

The instructor moves switch 74 to the run position bringing preceding auto 50 into view at a position determined by the setting of dial 58. Section 103 of switch 74 conducts the +15 volts through section 105 of switch 64 and resistor 53 to a zener diode 51 which provides a constant positive voltage at the junction of resistors 53 and 55 even when there is a slight variation in the +15 volts input. The +15 volts is blocked from gate 03 and relays 92 and 94 by diode 49. Resistor 55, a variable resistor, is calibrated to insure that dial 56 settings accurately represent the speed or velocity of preceding auto 50. When dial 56 is set to the desired speed, the corresponding positive voltage is conducted through diode 131, charges the top side of capacitor 133, passes through diode 132 and resistor 134 to section 98 of switch 64 which is connected, as described above, to the input of integrator 02. Resistor 134 is chosen to provide the proper time constant with capacitor 91, so that the distance of the preceding auto will correspond with the scale at 34. The voltage proportional to the speed of the preceding auto is positive, and upon passing through resistor 134 joins the negative output of integrator 01 at the junction of resistors 129 and 134. If the speed of the preceding auto is greater than that of the student's auto, the voltage into integrator 02 will be positive, resulting in a more negative output. This moves meter 48 which controls preceding auto 50 upward, thus increasing the distance between the two autos as indicated by scale 34. If both autos are traveling at the same speed, their voltages will be equal but opposite and they will cancel, whereby there will be no input into integrator 02 and no change in the output. Thus the preceding auto 50 will be stationary, signifying no change in distance between the two autos. If student's auto 40 is traveling at a faster rate than the preceding auto 50 the input will be negative and as the output of integrator 02 becomes less negative auto 50 will move down scale, approaching the student's auto 40.

The instructor may stop the preceding auto by moving switch 74 to the stop position. The normal braked stop with stoplight may be selected by moving the brake light switch 72 to the on position, thereby closing the switch, and moving the type-of-stop switch 76 to the normal position, thereby opening the switch. When switch 74 is moved to the stop position the +15 volts at section 103 of switch 74 is transferred from section 105 to switch 72 which conducts the voltage to the brake light 150, thereby signaling a stop. When the +15 voltage is removed from section 105 the voltage across potentiometer 56 becomes zero as does the voltage on the left terminal of diode 131. Since the top end of capacitor 133 was charged to the original speed voltage of the preceding auto, it will discharge at a rate dependent upon the time constant of capacitor 133 and the effective resistance discharging said capacitor. The positive voltage at the top of capacitor 133 cannot discharge through potentiometer 56 since diode 131 blocks the positive voltage and the type-of-stop switch 76 is open, preventing discharge through diode 130. The capacitor could discharge through diode 132 and resistor 134; however, the very high value of resistor 134 prevents this path from being prominent in the discharge of capacitor 133. Resistor 67 provides the main discharge path for the plus voltage at the top of capacitor 133. Resistor 67 and capacitor 133 are terminated at −13 volts, with the total voltage across said capacitor being a summation of the speed voltage of the preceding auto plus the 13 volts at the bottom of capacitor 133. Since the first part of a capacitor discharge through a resistor is linear, the discharge of the speed voltage to ground potential is linear and represents the actual braking characteristics of an automobile. As capacitor 133 discharges to a negative value, through resistor 67, its discharge rate becomes less linear but that portion of the discharge cycle is blocked from integrator 02 by diode 132 which passes only a positive voltage. It should be noted that variable resistor 67 is arranged for movement with road condition switch 68. When roads are dry, a small value of resistance 67 allows the preceding auto to stop in a normal manner. However, by setting road-conditions switches 68 and 67 to a different position, such as icy roads, a larger value of resistance is used, providing a much slower stop of the preceding auto.

As the preceding auto slows to a braked stop, the student must also stop. As has been previously mentioned, the difference in the speed voltages of the two autos causes a change in the clearance between autos 40 and 50. If the student is able to stop his auto before using up the clearance distance between the two autos, the input to integrator 02 becomes zero; and as there will then be no change in integrator 02 output, section 50 of meter 48 will be held stationary, showing the final stopping clearance between student's auto 40 and preceding auto 50. If the student was traveling too closely, too fast, or was slow to brake, the difference in stopping speeds of the two autos will be such that the negative speed voltage of the student's auto will be sufficient to cause the output of integrator 02 to move section 50 of meter 48 down into a collision or zero clearance position. If this should happen the alarm would be actuated and speedometer 22 of the student's auto clamped, as has been previously described.

The instructor may stop the preceding auto under different conditions. By moving brakelight switch 72 to the off position switch 72 is opened and the brake light will not be energized when the preceding auto is stopped. By moving type-of-stop switch 76 to the forced-stop position, switch 76 is closed. When the instructor stops the preceding auto, capacitor 133 can now discharge almost instantaneously through switch stop position, diode 130, and the low resistance of potentiometer 56 to ground, thereby bringing the preceding auto to an immediate stop.

With switch 74 in the hold position integrator 03 is held at zero as described above. When switch 74 is moved to the run position, section 108 of said switch transfers the input of integrator 03 to section 109 of switch 64 which is in the third or following-another-vehicle position and does not provide an input to integrator 03. When switch 74 is moved to the stop position, thus stopping the preceding auto, section 108 connects integrator 03 to the speed voltage output of integrator 01 via a brake switch 106 and resistor 104. This integrator and meter then records the reaction distance exactly as in previous tests.

At the end of the test, the instructor may return switch 74 to the hold position and run a new test under the same or different conditions.

The fourth test which may be given to the student is the "passing" test. Switch 64 will be moved to the passing position, while switch 74 is placed in the hold position. The instructor may set the auto and road conditions as previously discussed.

It should be pointed out that in the first three positions of gang switch 64, namely "object in road" test, "braking" test and "following another vehicle" test, section 136 of this switch has its first three contacts connected together so that anytime the vehicle goes over the centerline, there will be an alarm. In the fourth position of section 136 or switch 64, the centerline voltage comparator is connected directly to gate 02 with this gate in turn being connected through arm 138 of relay 82 to the bottom side of the coils of relays 94 and 92, Gate 02 can apply a ground to the bottom side of these coils for operation of the two relays when the centerline is crossed. When the run-hold switch is in the hold position, relays 94 and 92 cannot operate, as there is no voltage applied to the top side of these relays. The student's auto 40 must maintain a proper road position between the right shoulder 34 and the left shoulder 36 or the alarm will be actuated as in previous tests.

When the switch 74 is moved from the hold to the run position, +15 volts is applied through section 103 of switch 74 to section 105 of switch 64 where it applies power to relays 92 and 94 and gate 03. This positive voltage is also conducted through diode 49 to provide power for the speed circuit of the preceding auto, or auto 02. Also, by moving switch 74 to the run position, the speed and position of auto 02 will be determined by potentiometers 56 and 58 as described above. The student is then required to pass the preceding auto 50. He will accelerate his auto 40, causing the preceding auto 50 to approach. When the student is within a proper distance of auto 02 he will move his auto 40 into the passing lane. The centerline unit 117 will then energize relays 92 and 94, changing the following circuits. Since both arms 92 and 90 are moved to the downward position by their respective relays, the path from section 96 into integrator 02 is not changed and meter 48 will function as before. Arm 87 of relay 94 moves downward, thereby disconnecting the zero clearance unit 125, so the alarm will not be actuated upon passing. It is noted that had the student allowed the clearance between autos 40 and 50 to become zero, before moving into the passing lane, relay 82 would be actuated as described above, arm 138 of said relay would open the circuit between gate 02 and relays 92 and 94, thus making it impossible to complete the passing test. Arm 128 of relay 92 will also move downward, removing diode 126 from across integrator 02, thereby allowing its output to go positive as student's auto 40 passes auto 50. This is illustrated by section 50 dropping below auto 40 with scale 34 now displaying the number of car lengths behind the student's auto 40. Arm 140 of relay 92 will move downward grounding relay 92, thus this relay will remain energized when the centerline is recrossed, disconnecting the ground through gate 02. Diode 142 blocks the ground through arm 140 from also holding relay 94 closed. Arm 89 of relay 94 moves downward, applying a speed voltage to the input of integrator 03.

After the second auto 50 has moved far enough down scale to permit safe reentry the student moves his auto 40 back into the right lane. The centerline voltage comparator releases gate 02 which in turn removes the ground from the bottom of relay 94. As previously explained, relay 94 releases while relay 92 remains energized. Arm 87 upon moving upward connects the output of integrator 02 which now is positive, to the zero clearance unit which immediately operates gate 01 and relay 82 signifying the end of the test. The student is told that the alarm does not means an error on his part, merely the end of the test. Speedometer 22 is clamped by relay 82 showing the speed of the student's auto at the end of the test. Arm 93 upon returning to the up position opens the input to integrator 02 and thereby clamps its output with meter 48 reading the clearance between the student s auto and auto 02 at the instant the student's auto 40 pulls back in. Arm 89 in returning to the up position breaks the circuit into integrator 03 thereby clamping its output with meter 24 reading two types of distance which will now be described.

If potentiometer 60 is adjusted so that the center tap is at ground potential and the center tap of potentiometer 62 is adjusted to the top most position then meter 24 will show the distance traveled by the student's auto while the in the passing lane. This is accomplished by feeding the speed voltage output of integrator 01 through resistor 61, arm 89 of relay 94, which is closed only when auto 40 is in the passing lane, through section 109 of switch 64 and section 108 of switch 74 into integrator 03. The proper value of resistor 61 is selected to be used with capacitor 107 to provide the correct time constant for the second scale on meter 24 which is calibrated in hundredths of a mile.

For the second type of distance potentiometer 60 is adjusted to provide the desired speed of an approaching vehicle. Since the speed voltage of the approaching auto is also negative, it is upon passing through resistor 59 added to the speed voltage of the student s auto. Therefore, when arm 89 of relay 94 is in the down position, both speed voltages are applied to integrator 03 which then conducts a voltage to meter 24 proportional to the sum of the distances traveled by the two autos. Potentiometer 62 is adjusted to provide the initial distance between the student auto and the approaching auto at the time the student's auto crosses into the left lane. The output of potentiometer 62 provides a positive voltage equal to the desired clearance between the autos. This voltage is sent to voltage comparator 135 which compares the voltage from potentiometer 62 with the output of integrator 03. If the student is able to pass auto 02 and return to the right lane before the combined distance traveled by auto 40 and the approaching vehicle equals the preset clearance distance the test is ended and meter 24 indicates the total closing distance between the student's auto and the approaching vehicle. If the output voltage representing the closing distance between the two vehicles becomes equal to the preset voltage at potentiometer 62, gate 03 is actuated energizing relay 82 and prematurely ending the test. Variable resistors 57 an 63 are calibration resistors used to insure that the outputs of their corresponding potentiometers track with their proper dial settings.

At the end of the test the instructor moves switch 74 back to the hold position. Section 103 removes the +15 volts from the top of relay 92 which then returns all arms to the upper position. As described above, integrators 02 and 03 and their corresponding meters are returned to their initial conditions. A new test can then be run under the same or different conditions.

Although I have described four basic tests which can be accomplished through the use of the driver training apparatus shown, obviously there are other modifications which will provide further simulated driving conditions. In effect, however, I have provided a device which will simulate practically all road conditions or driving conditions encountered in normal operation of a vehicle. These conditions are simulated by means of voltages which are applied to integrating circuits.

This invention relates to a new and different type of driver training apparatus with the main objectives of this invention being:

1. The instructor presets the initial conditions for any one of a great number of driving situations. 2. The student, knowing the basic situation, has the same options as he would have under normal driving conditions; i.e., choice of speed, road position, and clearance between his auto and the preceding vehicle. 3. A situation requiring action on the student's part is actuated. 4. The student reacts to the situation as he would under actual driving conditions 5. If the student has chosen the proper speed, road position, etc., prior to the stimulus requiring action and then reacts in a normal manner, he will be able to keep his auto under control and avoid a collision. If not, a collision results and the severity of his error is indicated by various meters. 6. By this safe means, the student will learn to differentiate between proper and improper driving methods.

The invention should not be limited to the particular circuit configuration shown, nor to any of the particular voltages which are merely used as illustrative examples. What is important is to provide an electrical means, simple in construction, to simulate various driving conditions

I claim:

1. In a driver training and testing apparatus for operation by a person and including a simulated training unit with control members such as a steering wheel, an accelerator and a brake,
    means for changing the mechanical movement of the accelerator and the brake into a voltage proportional to velocity,
    means for indicating the instantaneous velocity of the simulated training unit,
    integrating means for changing the voltage proportional to velocity into a voltage proportional to a distance traveled by the simulated training unit,
    means for indicating said distance, and
    means for indicating the position of the simulated training unit in relationship to a roadway wherein the position of the training unit is responsive to a voltage means controlled by manipulation of a steering wheel.

2. The structure of claim 1 further characterized by means for varying the type of roadway encountered by the training unit from a straight roadway to a roadway having curves of varying degrees.

3. The structure of claim 2 further characterized by an additional integrating means, means for generating a voltage simulating lateral velocity of the simulated training unit, which generating means is connected to the input of said additional integrating means, the means for varying the type of roadway also being connected to said additional integrating means with the output of said additional integrating means indicating lateral position on the roadway.

4. The structure of claim 1 further characterized in that the means for developing a voltage proportional to velocity includes means for changing the mechanical movement of the accelerator and the brake respectively into voltages proportional to acceleration and deceleration,
    and acceleration integrating means for changing said voltages proportional to acceleration and deceleration into a voltage proportional to velocity.

5. The structure of claim 4 further characterized by means for simulating varying road conditions during deceleration.

6. The structure of claim 5 further characterized in that the means for simulating road conditions includes means for varying the deceleration voltage.

7. The structure of claim 1 further characterized by means for simulating different types of automobiles.

8. The structure of claim 7 further characterized in that said simulating means includes means for varying the acceleration and deceleration voltage.

9. The structure of claim 1 further characterized by means for simulating acceleration at different auto speeds.

10. The structure of claim 1 further characterized by alarm means operated when the simulated training unit moves out of the proper lane.

11. In a driver training and testing apparatus for operation by a person and including a simulated training unit with control members such as a steering wheel, an accelerator and a brake,
    means for changing the mechanical movement of the accelerator and the brake into a voltage proportional to velocity,
    means for indicating the instantaneous velocity of the simulated training unit,
    integrating means for changing the voltage proportional to velocity into a voltage proportional to a distance traveled by the simulated training unit,
    means for indicating said distance,
    means signaling the student driver to stop, and
    means for electrically measuring the distance the simulated training unit would have moved between initiation of the stop signal and application of the brakes.

12. The structure of claim 11 further characterized in that said measuring means includes integrating means, and switch means connecting said integrating means to the output of said means for developing a voltage proportional to velocity.

13. In a driver training and testing apparatus for operation by a person and including a simulated training unit with control members such as a steering wheel, an accelerator and a brake,
    means for changing the mechanical movement of the accelerator and the brake into a voltage proportional to velocity, said means includes means for changing the mechanical movement of the accelerator and the brake respectively into voltages proportional to acceleration and deceleration,
    acceleration integrating means for changing said voltages proportional to acceleration and deceleration into a voltage proportional to velocity,
    means for indicating the instantaneous velocity of the simulated training unit,
    integrating means for changing the voltage proportional to velocity into a voltage proportional to a distance traveled by the simulated training unit,
    means for indicating said distance, and
    means for simulating different acceleration at different auto speeds, said means includes a resistive feedback path from the output of said acceleration integrating means to its input.

14. In a driver training and testing apparatus for operation by a person and including a simulated training unit with control members such as a steering wheel, an accelerator and a brake,
    means for changing the mechanical movement of the accelerator and the brake into a voltage proportional to velocity,
    means for indicating the instantaneous velocity of the simulated training unit,
    integrating means for changing the voltage proportional to velocity into a voltage proportional to a distance traveled by the simulated training unit,
    means for indicating said distance, and
    means for electrically measuring the distance traveled by the simulated training unit from initiation of a stop signal until full stop.

15. The structure of claim 14 further characterized in that said measuring means includes a meter, calibrated in distance, and connected to the output of said integrating means.

16. In a driver training and testing apparatus for operation by a person and including a simulated training unit with control members such as a steering wheel, an accelerator and a brake,
    means for changing the mechanical movement of the accelerator and the brake into a voltage proportional to velocity,
    means for indicating the instantaneous velocity of the simulated training unit, integrating means for changing the voltage proportional to velocity into a voltage proportional to a distance traveled by the training unit, means for indicating said distance, means for indicating the position of the simulated training unit in a roadway, and means for simulating the entrance of an object in the roadway at a variable predetermined distance ahead of the simulated training unit.

17. The structure of claim 16 further characterized in that the means for simulating an object in the roadway includes a voltage combined with the output of said first integrating means, said voltage representing the distance between said object and said training unit.

18. The structure of claim 17 further characterized in that said simulated object is fixed.

19. The structure of claim 18 further characterized by means for indicating the distance between the simulated object and the simulated training unit if said simulated training unit is stopped before hitting said object.

20. The structure of claim 16 further characterized by means for indicating a collision if said simulated training unit is not stopped before hitting said object.

21. The structure of claim 20 further characterized by an alarm, said collision indicating means energizing said alarm and holding the velocity indicating means.

22. In a driver driver training and testing apparatus for operation by a person and including a simulated training unit with control members which as a steering wheel, an accelerator and a brake, means for changing the mechanical movement of the accelerator and the brake into a voltage proportional to velocity, means for indicating the instantaneous velocity of the simulated training unit, integrating means for changing the voltage proportional to velocity into a voltage proportional to a distance traveled by the simulated training unit, means for indicating said distance, means for indicating the position of the simulated training unit in a roadway, means for simulating a movable object in the roadway ahead of the simulated training unit, and means for simulating a predetermined velocity of said movable object.

23. The structure of claim 22 further characterized by means for stopping said object.

24. The structure of claim 23 further characterized by means for indicating the distance between the movable object and the simulated training unit if said simulated training unit is stopped before hitting said object.

25. The structure of claim 22 further characterized by means for simulating passing, by the simulated training unit, around the movable object.

26. The structure of claim 25 further characterized by means for measuring the distance the simulated training unit is out of the right-hand lane and in the passing lane.

27. The structure of claim 25 further characterized by means for simulating an approaching movable object in the left-hand lane.

28. The structure of claim 27 further characterized by means by measuring the closing distance between the approaching movable object and the simulated training unit when the training unit returns to the righT-hand lane.

29. The structure of claim 27 further characterized by means for presetting the distance between said approaching movable object and said simulated training unit.

30. The structure of claim 29 further characterized by means for indicating a collision if said simulated training unit does not return to the right lane before said preset distance is covered by said approaching movable object and said simulated training unit.

31. The structure of claim 30 further characterized by an alarm, said indicating means energizing said alarm, and means for displaying the relative positions of the simulated training unit and the movable object being passed.

32. The structure of claim 22 further characterized in that means for simulating velocity of said object includes means for providing a voltage at the input of said integrating means.